(12) United States Patent
Herr et al.

(10) Patent No.: US 9,530,178 B2
(45) Date of Patent: *Dec. 27, 2016

(54) NON-VOLATILE STORAGE FOR GRAPHICS HARDWARE

(71) Applicant: Intel Corporation, Santa Clara, CA (US)

(72) Inventors: Adam W. Herr, Forest Grove, OR (US); Adam T. Lake, Portland, OR (US); Ryan T. Tabrah, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,031

(22) Filed: May 27, 2015

(65) Prior Publication Data

US 2015/0278985 A1  Oct. 1, 2015

Related U.S. Application Data

(63) Continuation of application No. 12/790,812, filed on May 29, 2010, now Pat. No. 9,058,675.

(51) Int. Cl.

| | |
|---|---|
| *G06T 15/00* | (2011.01) |
| *G06F 15/16* | (2006.01) |
| *G09G 5/00* | (2006.01) |
| *G06F 13/00* | (2006.01) |
| *G06F 13/14* | (2006.01) |
| *G06T 1/60* | (2006.01) |
| *G06T 19/00* | (2011.01) |

(52) U.S. Cl.
CPC ............... *G06T 1/60* (2013.01); *G06T 15/005* (2013.01); *G06T 19/006* (2013.01)

(58) Field of Classification Search
CPC ........ G06T 1/60; G06T 15/005; G06T 19/006; G06T 1/20; G09G 5/363; G06F 3/14
USPC .................. 345/522, 503, 501, 582; 711/170
See application file for complete search history.

(56) References Cited

U.S. PATENT DOCUMENTS

| | | |
|---|---|---|
| 5,357,614 A | 10/1994 | Pattisam et al. |
| 6,118,116 A | 9/2000 | Sawada et al. |
| 6,370,631 B1 | 4/2002 | Dye |
| 6,704,021 B1 | 3/2004 | Rogers et al. |
| 6,756,986 B1 * | 6/2004 | Kuo ....................... G09G 5/393 345/422 |

(Continued)

FOREIGN PATENT DOCUMENTS

| | | |
|---|---|---|
| CN | 101388110 A | 3/2009 |
| WO | 2011/153041 A2 | 12/2011 |
| WO | 2011/153041 A3 | 12/2011 |

OTHER PUBLICATIONS

Office Action received for Taiwan Patent Application No. 100115129, mailed Apr. 25, 2014, 11 pages of English Translation and 8 pages of TW Office Action.

(Continued)

*Primary Examiner* — Ke Xiao
*Assistant Examiner* — Nicole Gillespie
(74) *Attorney, Agent, or Firm* — Jordan IP Law, LLC

(57) ABSTRACT

Methods and systems may provide for an apparatus having a graphics processing unit (GPU) and a non-volatile memory dedicated to the GPU. If a request for content is detected, a determination may be made as to whether the non-volatile memory contains the content.

22 Claims, 4 Drawing Sheets

(56) References Cited

U.S. PATENT DOCUMENTS

| | | |
|---|---|---|
| 6,947,051 B2 | 9/2005 | Gossalia et al. |
| 7,173,635 B2 | 2/2007 | Amann et al. |
| 8,274,516 B2 | 9/2012 | Michail et al. |
| 2004/0160446 A1 | 8/2004 | Gosalia et al. |
| 2008/0106552 A1 | 5/2008 | Everitt |
| 2008/0192063 A1 | 8/2008 | Liao et al. |
| 2008/0246773 A1 | 10/2008 | Jiao et al. |
| 2009/0128575 A1 | 5/2009 | Liao et al. |
| 2010/0026700 A1 | 2/2010 | Michail et al. |
| 2010/0122259 A1 | 5/2010 | Gosalia et al. |

OTHER PUBLICATIONS

Office Action received for German Patent Application No. 10-2011-101202.1, mailed Jun. 4, 2014, 8 pages of Office Actions and 7 pages of English Translation.
Notice of Grant received for Chinese Patent Application No. 201110138135.0, issued May 6, 2013, 3 pages of English Translation and 4 pages of Notice of Grant.
Office Action received for Chinese Patent Application No. 201110138135.0, mailed Sep. 18, 2012, 6 pages of English Translation and 10 pages of Office Action.
Preliminary Report on Patentability received for PCT application No. PCT/US2011/037987, mailed on Dec. 13, 2012, 6 pages.
International Search Report and Written Opinion received for PCT application No. PCT/US2011/037987, mailed on Jan. 18, 2012, 7 pages.

\* cited by examiner

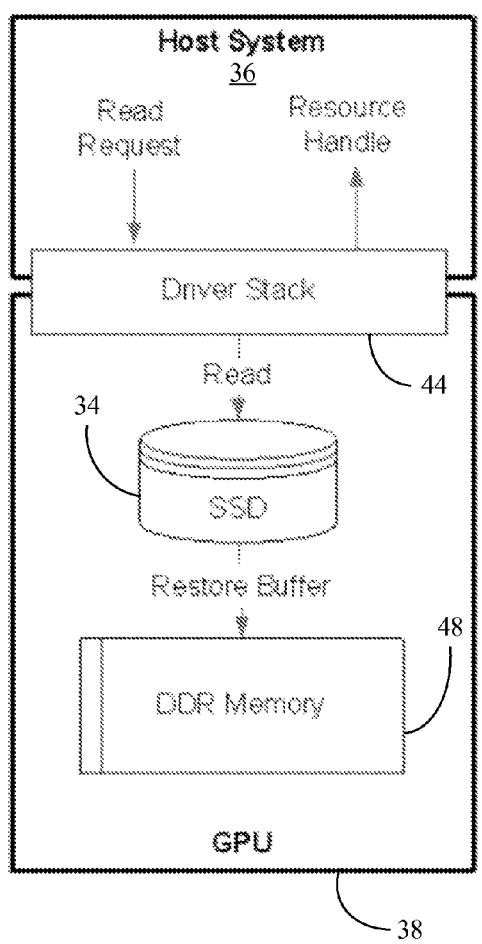
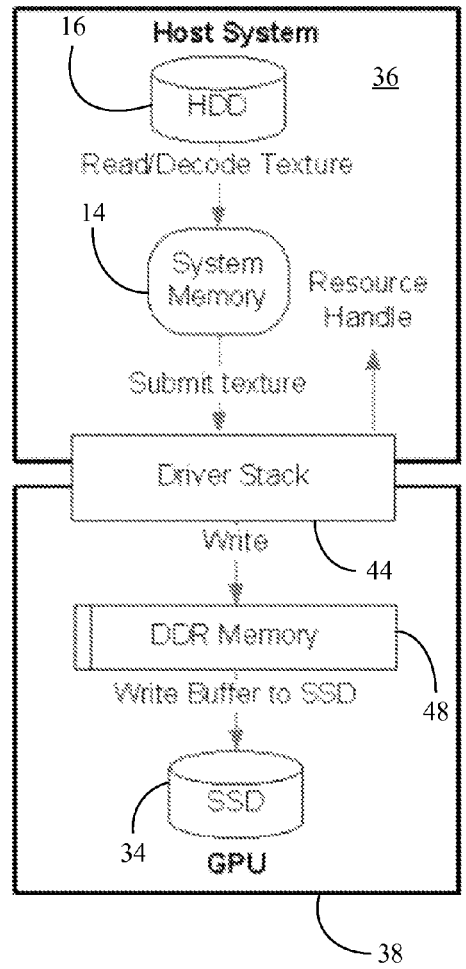
FIG. 3A       FIG. 3B

NON-VOLATILE STORAGE FOR GRAPHICS HARDWARE

CROSS-REFERENCE TO RELATED APPLICATIONS

The present application is a continuation of U.S. patent application Ser. No. 12/790,812 filed on May 29, 2010.

BACKGROUND

Game engines may be highly optimized pieces of software that provide a framework for 3D (three dimensional) rendering, user interaction, scene management, physics modeling, artificial intelligence and other capabilities needed for a given game application. Game applications can use hardware-accelerated graphics APIs (application programming interfaces) to leverage the capabilities of a local GPU (graphics processing unit), wherein this leveraging can include offloading graphical and non-graphical computation to the GPU in order to maintain interactive frame rates. In particular, the normal methodology may be to transfer content from the host system's disk, decode/decompress the content as necessary into system memory, then transfer the content to the GPU using an API (e.g., DirectX or OpenGL APIs). This process is typically bound by the disk IO (input/output) capability of the host system. Accordingly, there can be considerable overhead imposed by the host system hardware during memory operations (e.g., the load, transfer and storage of game assets to/from volatile memory dedicated to the GPU). Indeed, such overhead may be experienced each time the application initializes or updates during run-time.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3A is a block diagram of an example of a process flow for texture content contained in non-volatile memory of a GPU according to an embodiment;

FIG. 3B is a block diagram of an example of a process flow for texture content not contained in non-volatile memory of a GPU according to an embodiment;

DETAILED DESCRIPTION

Embodiments may provide for a computer readable storage medium including a set of stored instructions which, if executed by a processor, cause a computer to detect a request for content and determine whether a non-volatile memory dedicated to a graphics processing unit (GPU) contains the content.

Embodiments can also provide for an apparatus including a graphics processing unit (GPU), a non-volatile memory dedicated to the GPU, and a computer readable storage medium. The computer readable storage medium may include a set of stored instructions which, if executed by a processor, cause the apparatus to detect a request for content and determine whether the non-volatile memory contains the content. The computer readable storage medium may be part of, or separate from, the non-volatile memory.

Other embodiments may include a system having a host device with a central processing unit (CPU) to execute a graphics application. The system can also include a graphics processing unit (GPU), a non-volatile memory dedicated to the GPU, and a volatile memory dedicated to the GPU. In addition, the system may include a computer readable storage medium including a set of stored instructions which, if executed by a processor, cause the system to detect a request for texture content from the graphics application and determine whether the non-volatile memory contains the texture content. The instructions can also cause the system to allocate a buffer resource to the texture content if the non-volatile memory contains the texture content, and return an identifier of the buffer resource to the host device. The instructions may also cause the system to transfer the texture content to the buffer resource if a graphics optimization criterion is met, and transfer the texture content from the buffer resource to the volatile memory via a direct memory access (DMA) request.

Figure 1:
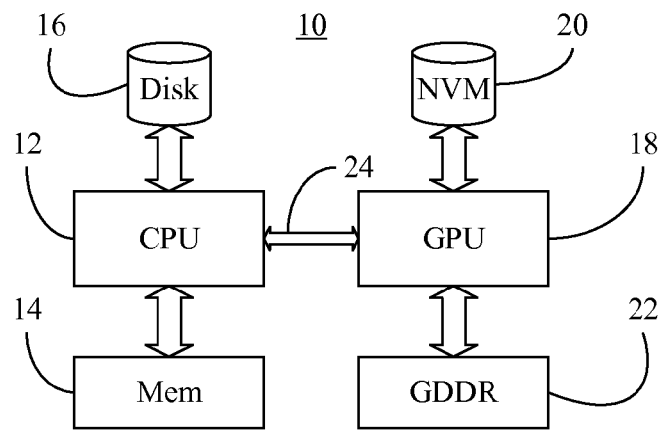
FIG. 1 is a block diagram of an example of a conceptual computing architecture according to an embodiment.

Turning now to FIG. 1, an architecture 10 includes a host device with a CPU 12, volatile memory such as system memory 14, and non-volatile memory such as disk 16. The illustrated architecture 10 also includes a GPU 18 with a dedicated non-volatile memory (NVM) 20 and a dedicated volatile memory such as a graphics double data rate (GDDR) memory 22. As will be discussed in greater detail, the GPU 18 and NVM 20 may reside on the same or separate cards/substrates. The NVM 20 could be a NAND-based SSD (solid state disk), a USB (Universal Serial Bus, e.g., USB Specification 2.0, USB Implementers Forum) flash storage device, a hard disk drive (HDD), etc. The GPU 18 and its dedicated memories 20, 22 may communicate with the CPU 12 over a graphics bus 24 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus.

By providing the GPU 18 with a dedicated NVM 20, the illustrated architecture 10 represents a more balanced platform in which advanced graphics rendering and compute capabilities can be facilitated. As will be discussed in greater detail, the ability to quickly transfer graphical content from the NVM 20 to the GDDR 22 can enable content to bypass the traditional GPU loading mechanism and may therefore offer significantly improved load times for graphics applications. For example, the content/assets loaded into the 3D graphics pipeline can be stored in the NVM 20 for later use, wherein the stored data may be loaded at a later time and reconstituted within the 3D graphics pipeline in the same state in which the data existed when it was stored. As a result, load performance may be improved.

Other load time performance improvements may involve the use of procedurally generated content. Such content might result from a variety of algorithmic techniques, which can be computational expensive. Instead of generating procedural content at load time, procedural assets may be generated once then stored in the NVM 20 for later recovery. This approach can reduce the amount of potentially redundant content generation, which may further improve load times. In particular, such an approach could be used in dynamic level-of-detail (LOD) systems, where computationally expensive mesh subdivision or simplification might only be applied once per unique object. Different versions of each mesh (at various LODs) could be pre-computed in this manner and cached on the NVM 20 for later use. Accordingly, LOD levels may be computed only once for an application and allowed to persist across multiple load cycles. The architecture 10 can enable other advantages to be obtained, as will be discussed in greater detail.

Figure 2:
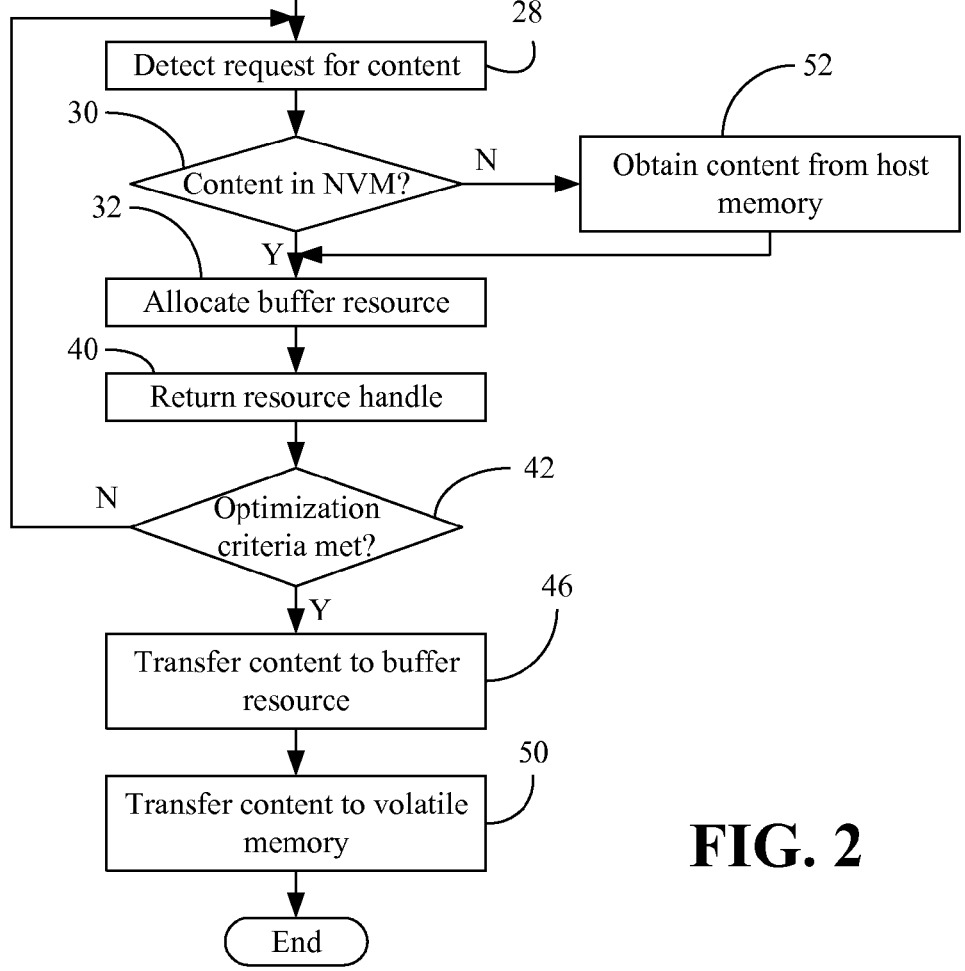
FIG. 2 is a flowchart of an example of a method of processing content according to an embodiment.

FIG. 2 shows a method 26 of processing content. The method 26 may be implemented as a set of executable device driver instructions stored in a machine- or computer-readable storage medium such as random access memory (RAM), read only memory (ROM), programmable ROM (PROM), flash memory, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 26 may be written in any combination of one or more programming languages, including an object oriented programming language such as C++ or the like and conventional procedural programming languages, such as the "C" programming language or similar programming languages. Moreover, the method 26 could be implemented as embedded logic using any of the aforementioned circuit technologies.

With continuing reference to FIGS. 2 and 3A, processing block 28 provides for detecting a request (e.g., "read request") for content. In one example, the read request is received and processed by a driver stack 44 that functions as an interface between a host device/system domain 36 and a GPU domain 38. The content might include texture content, vertex content, and/or procedurally generated content as already discussed, wherein the read request could be received from a graphics application executing on a CPU in the host system domain 36. If it is determined at block 30 that an NVM such as an SSD 34, which is dedicated to the GPU domain 38, contains the requested content, a buffer resource may be allocated to the content at block 32. Block 40 provides for returning an identifier of the buffer resource (e.g., "resource handle") to the host system domain 36.

A determination may be made at block 42 as to whether one or more optimization criteria are met. The optimization criteria might be used by the driver stack 44 to reorder, consolidate and otherwise optimize requests. For example, advanced implementations may involve the optimization of the file system for streaming loads, the optimization of spatial locality of accesses and/or the batching of read and write requests, and so on. Moreover, some form of data compression on the SSD 34 file system may be advantageous to increase the speed of data loads. Simply put, the read of the actual contents into the allocated buffer resource can be deferred until it is "performant", urgent or otherwise appropriate that reads be completed. If the optimization criteria are met, illustrated block 46 provides for transferring the content to the allocated buffer resource. The content can be transferred from the buffer resource to a dedicated volatile memory such as DDR memory 48 at block 50. In one example, the transfer to DDR memory 48 is conducted via one or more DMA (direct memory access) requests.

With continuing reference to FIGS. 2 and 3B, if it is determined at block 30 that the requested content does not reside in the SSD 34, block 52 provides for obtaining the content from the memory of the host system domain 36. For example, in the illustrated example a read/decode is conducted on the disk 16 and the results are transferred into the system memory 14. The content can then be submitted to the driver stack 44, which returns a handle for a buffer resource associated with the DDR memory 48. In addition, a write from the DDR memory 48 to the SSD 34 may be performed so that the next time the content is requested, it may be retrieved from the SSD 34 in the GPU domain 38.

Figure 4A:
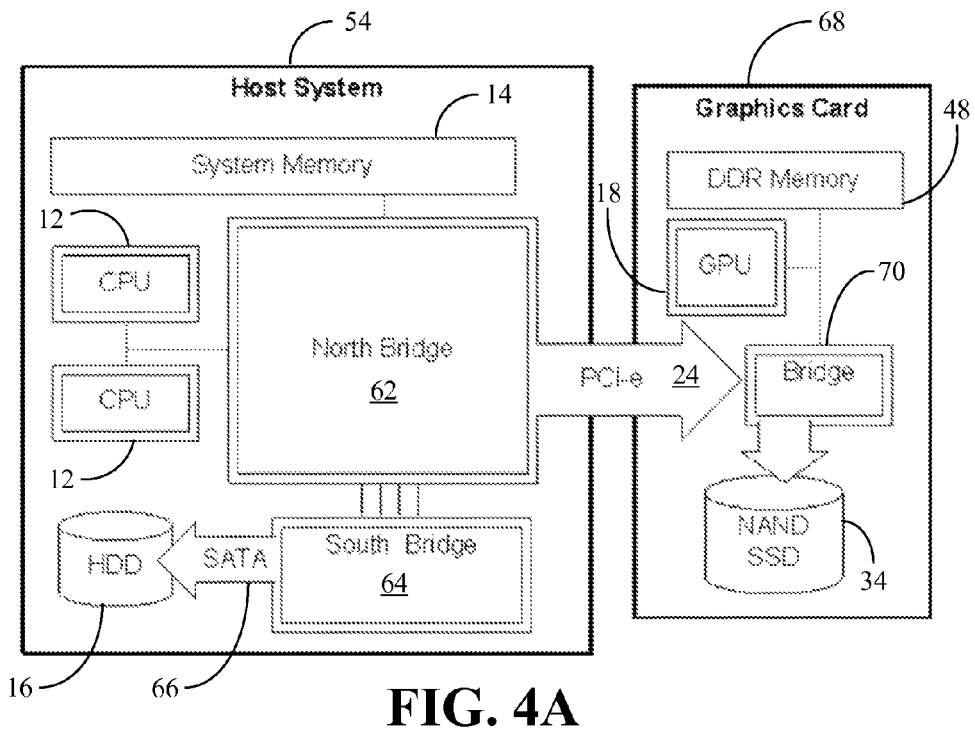
FIGS. 4A and 4B are block diagrams of examples of systems according to embodiments.
Figure 5A:
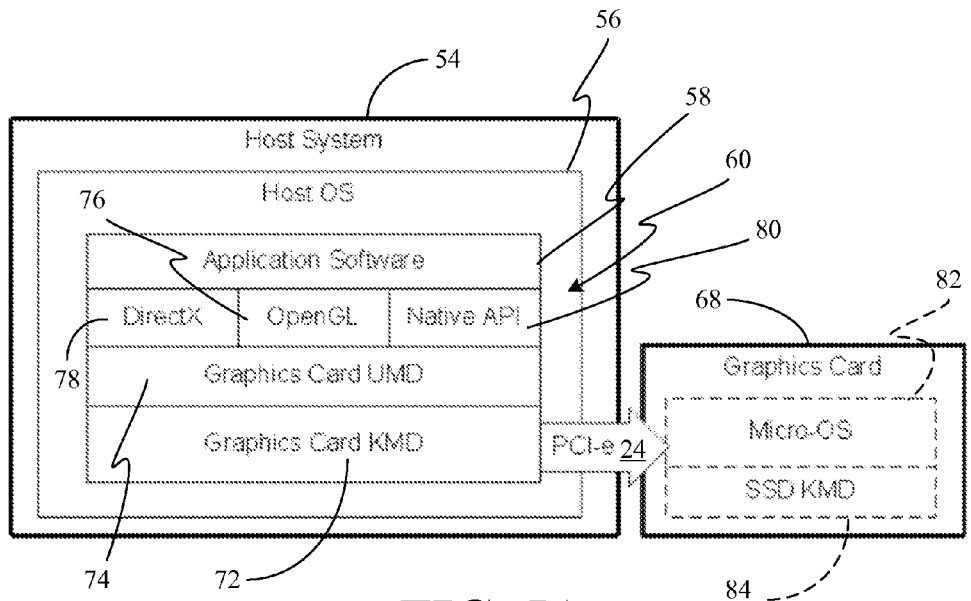
FIGS. 5A and 5B are block diagrams of examples of driver stacks according to embodiments.

Turning now to FIGS. 4A and 5A, a hardware implementation and its respective driver stack are shown. In particular, a host device/system 54 may be part of a mobile platform such as a laptop, personal digital assistant (PDA), wireless smart phone, media player, imaging device, mobile Internet device (MID), etc., or any combination thereof. The system 54 may also be part of a fixed platform such as a personal computer (PC), server, workstation, etc. The illustrated system 54 includes a plurality of CPUs 12 and system memory 14, which could include DDR synchronous dynamic random access memory (SDRAM, e.g., DDR3 SDRAM JEDEC Standard JESD79-3C, April 2008) modules. The modules of the system memory 14 may be incorporated into a single inline memory module (SIMM), dual inline memory module (DIMM), small outline DIMM (SODIMM), and so on. The illustrated CPUs 12 communicate with the system memory 14 via a North Bridge 62.

The CPUs 12 may also communicate with the disk 16 via the North Bridge 62 and a South Bridge 64. In the illustrated example, the South Bridge 64 and disk 16 communicate over a Serial ATA (SATA, e.g., SATA Rev. 3.0 Specification, May 27, 2009, SATA International Organization/SATA-IO) bus 66. The host system 54 may include a graphics bus 24 (e.g., PCI-e slot), wherein a graphics card 68 containing the GPU 18, DDR memory 48, SSD 34 and a bridge 70 could be coupled (e.g., plugged into) the graphics bus 24. Thus, in the illustrated the "on-board model", SSD access can be achieved by the GPU 18 through a direct physical connection on the graphics card 68, which may either be mounted directly on the board of the host system 54 or mounted elsewhere in the system chassis and connected with a cable. The graphics card 68 may be modified to include an onboard dedicated bus and/or disk controller to support the SSD.

In particular, the CPUs 12 may have processor cores (not shown) to execute a host OS (operating system) 56, application software 58, and a driver stack 60, where each core may be fully functional with instruction fetch units, instruction decoders, level one (L1) cache, execution units, and so on. Generally, the driver stack 60 may include at the lowest level, kernel mode driver (KMD) 72 that provides "ring-0" access to the hardware on the graphics card 68. A user mode driver (UMD) 74 can sit atop the illustrated KMD 72 and expose particular features of the graphics hardware on a per application basis. Thus, failures in the UMD 74 may present as application-level exceptions, whereas KMD 72 failures could be system-wide. In the illustrated example, an OpenGL (e.g., OpenGL 4.0, the Khronos Group, Mar. 10, 2010) API 76 and a DirectX (e.g., Direct® 11, Microsoft Corporation, Redmond, Wash.) API 78 are extended at the driver level to include hardware specific extensions to each API. In addition, a native API 80 may be used to extend DirectX for GPU-SSD operations, whereas OpenGL could be augmented though a customary extensions interface. Specific APIs are described herein to facilitate discussion only. Finally, sitting atop the illustrated DirectX API 78, OpenGL API 76, and Native API 80 is application software 58, which may leverage the capabilities of each.

In the on-board example shown, the driver stack 60 takes into consideration the specific components employed in the physical implementation of the graphics card 68. The host driver stack 60 may be structured in multiple ways: the software stack for both graphics adaptor and the SSD could be implemented in the host OS 56, the SSD drivers could be implemented on a μOS (micro-OS) 82 running independently on the graphics card 68, and so on. In the first case, the GPU 18 may be seen as a passive device that is subordinate to the host OS 56, and the drivers for the SSD 34 and GPU 18 could be combined as a single entity made up of driver instructions to be executed by the CPUs 12. In the second case, the GPU 18 may be seen as autonomous from the host OS 56, relying on its own μOS 82 to service IO requests. In this case, the SSD driver may be implemented as an SSD KMD 84 specifically for the μOS 82, wherein the GPU 18 executes the instructions for SSD KMD 84 and the host driver stack 60 simply forwards IO requests to be dispatched on the graphics card 68.

Figure 4B:
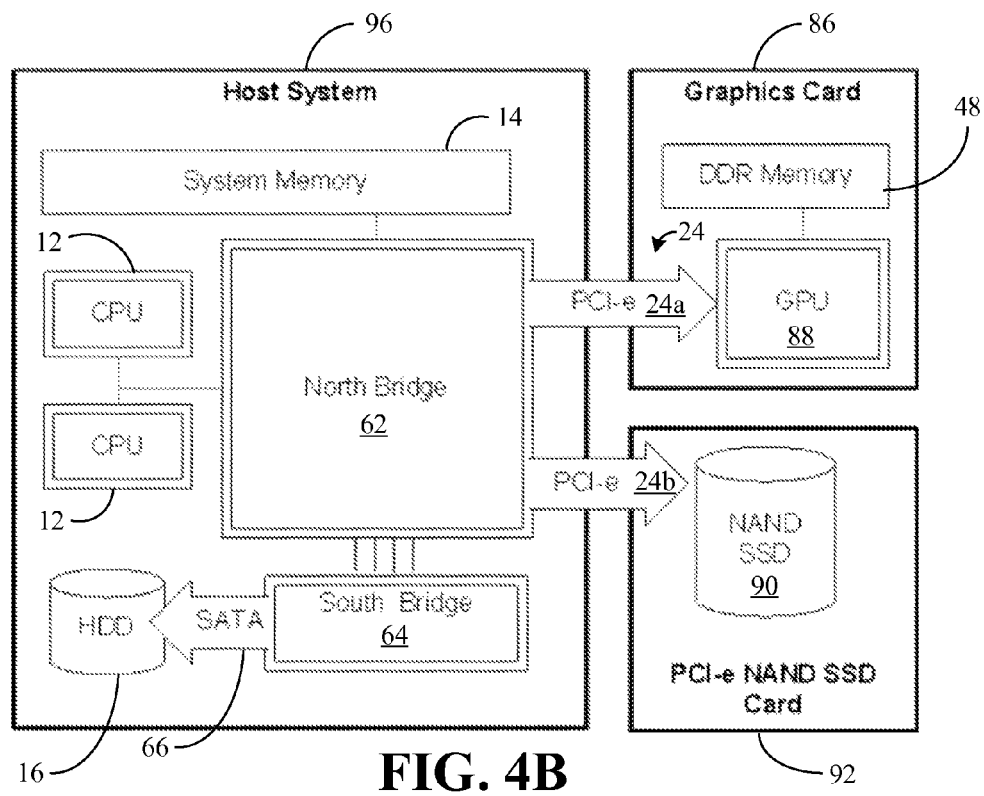
Figure 5B:
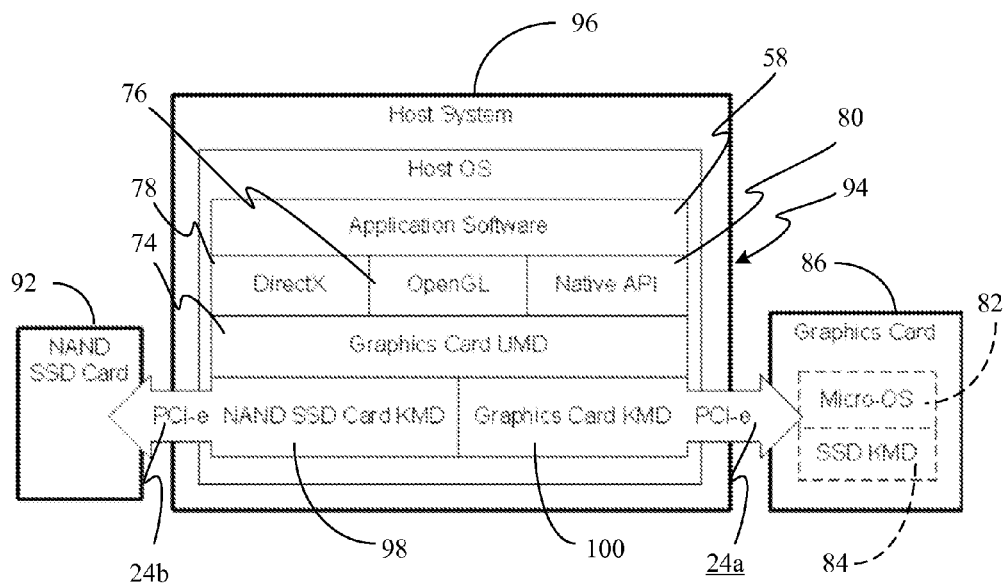

Turning now to FIGS. 4B and 5B, an alternative hardware configuration and corresponding driver implementation are shown in which a "cooperative model" is used. In the illustrated example, a graphics card 86 contains a GPU 88 and the DDR memory 48, whereas an SSD 90 is coupled to a separate memory card 92. Thus, the graphics bus 24 (24a-24b) could include a first bus 24a coupled to the graphics card 86 and a second bus 24b coupled to the memory card 92. In the cooperative model, the graphics hardware may be unmodified and combined with a commercially available PCI-e based SSD 90 (e.g., SSD device from vendors such as Addonics, DDRdrive, and Dolphin, Fuji Xerox, Fusion-io, Intel, Micron and SanDisk). Rather than attaching the SSD 90 to a conventional HDD and maintaining HDD mounting form factors, the SSD 90 could be implemented entirely on a PCI-e expansion board, which may place an upper bound on disk throughput to that of PCI-e (e.g., 32 Gb/s). When compared to the SATA throughputs (e.g., 4.8 Gb/s), such a solution could offer greater throughput for a lower attachment cost.

Thus, the integration of the GPU 88 and SSD 90 may involve simply plugging each corresponding card 86, 92 into adjacent memory slots. Moreover, the mechanics of the integration could be handled by a graphics driver stack 94 on the host system 96. Generally, the graphics driver stack 94 could have low-level access to a SSD driver to facilitate direct memory accesses between the DDR memory 48 and the SSD 90. This approach may increase the traffic over the graphics bus 24, which could result in lower performance than the on-board solution. Although the traffic generated between the GPU 88 and the SSD 90 may compete with traffic between the GPU 88 and host system 96, a variety of driver-level optimizations (e.g., including data caching and I/O scheduling) could mitigate this contention.

In particular, in the illustrated example, the SSD 90 and the graphics adaptor for the GPU 88 could cooperate in a number of different ways. One scenario may involve an SSD card KMD 98 and a graphics card KMD 100 that expose a low-level interface that allows the SSD 90 to DMA the DDR memory 48 contained on the graphics card 86. Another possible scenario might involve the graphics card 86 exposing SSD hooks that can be lined into via a published interface. There are many other configurations, but a generalization is that the SSD card KMD 98 and graphics card KMD 100 may be independent pieces of software, possibly from different vendors, with some low-level interface that enables interoperability between the two devices.

Example Pipeline Integration

The above techniques may be designed for interoperability with existing graphics pipelines such as DirectX pipelines. While portions of this discussion may refer to DirectX, the approaches described herein may be readily extended to other scenarios such as OpenGL pipelines. The basic structure of SSD reads and writes can be consistent with the conventional DirectX command buffer—the set of commands typically used to dispatch draw and state change requests may be augmented with a small number of IO commands to ensure that IO requests preserve in-order execution.

The fundamental unit of storage in this software architecture could be a DirectX buffer resource containing texture, vertex or other content used during rendering. When buffers are written to the SSD, all of the run-time state information associated with the buffer can be written in the file system along with its respective data. Similarly, when buffer data is reconstituted from the SSD, the run-time state of that resource may be reconstituted in the same state the buffer was in when it was saved. Each IO request can contain a string that corresponds to a specific file path in a hierarchical file system.

The way the command buffer is utilized in read and write requests may differ slightly. For example, a read request can issue a "SSD_READ_QUERY" command that is inserted in a queue and host blocks. When the SSD_READ_QUERY request is serviced, the path can be extracted from the command and the local file system may ensure that the file exists. If the file is valid, a file descriptor may be used to allocate a buffer with an identical configuration as was used when the file was originally stored. As soon as the buffer is allocated, the caller could be returned a valid resource handle and an "SSD_READ_DEFFERED" command may be inserted into the command buffer. Up until this point, all that may have been obtained from the file system is the file descriptor. The read of the contents into the allocated buffer can be deferred until an optimization criterion is met. The driver may guarantee that the contents of a buffer will be loaded from storage prior to its first access, but prior to this the driver can have the latitude to reorder, consolidate and otherwise optimize requests as appropriate.

Write requests could be much simpler than read requests, as there may be no need to defer access because the caller is not waiting for a valid resource handle to return. When a write is issued, a "SSD_WRITE" command may be inserted into the command buffer. When this command is dispatched, the path can be extracted and the buffer resource and its descriptor may be written to the SSD. There are many opportunities for optimization though deferral here, but these may be highly specific to the driver implementation.

The aforementioned software architecture can culminate into the essential read and write operations necessary for utilizing a GPU-side file system. Since this functionality could fall outside the DirectX or other API specification, a native API 80 may be created that provides abstraction around the augmented driver. The native API 80 can contain additional features for manipulating and interrogating the file system. These features might include functions for directory management including creation, deletion, copy, move and listing. The native API 80 may also contain support for reading, writing, renaming and deleting individual files, as well as page-files, late-binding mechanisms and file security. Below are examples of some function specifications of the native API 80 that may be provided.

Write Configuration

APIERROR APIOFileStoreBuffer(const APICONTEXT in_context, const char*in_pFileName, APIBUFFER in_buffer)

This function can write the configuration and content of "in_buffer" to the GPU-side file system at the path specified in "in_pFileName". The buffer contents are written to disk, including a header that contains information on how the APIBuffer resource is to be allocated and configured when reconstituted by the API0FileLoadBuffer. The buffer can be guaranteed to be written to disk prior to any modification of the specified buffer.

Parameters:
in_context [in] The context associated with the APIBuffer asset
in_pFileName [in] The path of the file to write the buffer to
in_buffer [in] The buffer resource to write
Returns:
API_SUCCESS; the buffer was successfully written.
API_ALREADY_EXISTS; the specified file name already exists.
API_DOES_NOT_EXIST; a directory in the file path is inaccessible.
API_INVALID_HANDLE; the buffer handle is invalid.
API_OUT_OF_MEMORY; there is not enough space available to store the file.
API_NOT_SUPPORTED; there is no GPU-side storage device available.

Load File
APIERROR API0FileLoadBuffer(const APICONTEXT in_context, const
char*in_pFileName, APIBUFFER*out_buffer)
This function can load a file previously stored using the API0FileLoadBuffer function. It loads the file specified in "in_pFileName", reads the files header, creates an appropriate buffer resource and loads the file contents accordingly. Upon success, the handled pointed to by "out_buffer" will contain the same state and content as it did when it was stored. This buffer can be allocated according to its configuration and may be freed using the API0FileDestroyBuffer function, which ensures that it is free in a manner appropriate to its creation. This function may return with success when the specified file is found and an appropriate buffer is allocated. The actual reading from disk to buffer memory may be defered, but will be complete prior to the buffers first access.

Parameters:
in_context [in] The context associated with the APIBuffer asset
in_pFileName [in] The path of the file to read the buffer from
out_buffer [out] The buffer resource to create
Returns:
API_SUCCESS; the buffer was successfully written.
API_ALREADY_EXISTS; the specified file name already exists.
API_DOES_NOT_EXIST; the request file is not available.
API_INVALID_HANDLE; the buffer handle is invalid.
API_NOT_SUPPORTED; there is no LRB-side storage device available.

Free Buffer
APIERROR API0FileDestroyBuffer(const APICONTEXT in_context, APIBUFFER in_buffer)
This function may free a buffer obtained using the API0FileLoadBuffer function. This function can ensure that the buffer is deleted in a manner consistent with its creation. Since APIFile can handle both Native and DirectX shared surfaces, the underlying deallocation process may differ for each case.

Parameters:
in_context [in] The context associated with the APIBuffer when loaded
in_buffer [in] The buffer resource to free
Returns:
API_SUCCESS; the buffer was successfully freed.
API_INVALID_HANDLE; the buffer handle is invalid.
API_NOT_SUPPORTED; there is no LRB-side storage device available.

Delete File
APIERROR API0FileDelete (const APICONTEXT in_context, const char*in_pName)
This function can delete an existing file stored using the API0FileStoreBuffer function. If "pFileName" refers to a directory, the directory must be empty for the deletion to succeed.

Parameters:
in_context [in] The context execution context
in_pName [in] The name of the file or directory to delete
Returns:
API_SUCCESS; the file or directory was successfully deleted.
API_DOES_NOT_EXIST; the request file or directory is not available.
API_RETRY; the request directory is not empty.
API_NOT_SUPPORTED; there is no LRB-side storage device available.

List File
APIERROR API0FileGetDirectoryList (const APICONTEXT in_context, const char*in_pName, API_FILE_DIR⁺ LIST*out_fileNames)
This function is used to obtain a list of file names contained within the specified directory.

Parameters:
in_context [in] The context execution context
in_pName [in] The name of the directory to list
out_fileNames [out] A structure containing all file names within the specified directory
Returns:
API_SUCCESS; the file or directory list was successfully obtained.
API_DOES_NOT_EXIST; the request directory is not available.
API_NOT_SUPPORTED; there is no LRB-side storage device available.

Free List
APIERROR API0FileFreeDirectoryList (API_FILE_DIR_LIST*inout_fileNames)
This function frees an existing API_FILE_DIR_LIST structure obtained from a prior call to API0FileGetDirectoryList.

Parameters:
inout_fileNames [in/out] the address of the file list to free
Returns:
API_SUCCESS; the directory list was successfully freed.
API_INVALID_POINTER; the directory list specified is invalid.

Create Directory
APIERROR API0FileNewDirectory (const APICONTEXT in_context, const char*in_pName)
This function creates as new directory on the GPU-side mass storage device.

Parameters:
in_context [in] The context execution context
in_pName [in] The name of the directory to create Returns:

API_SUCCESS; the directory was successfully created.

API_ALREADY_EXISTS; the specified directory already exists.

API_DOES_NOT_EXIST; a directory in the file path is inaccessible.

API_OUT_OF_MEMORY; there is not enough space available to create the directory.

API_NOT_SUPPORTED; there is no LRB-side storage device available.

Thus, the techniques described herein can offer a number of improvements for graphics applications, such as combining texturing techniques with a large SSD storage capacity. An example is gigapixel image manipulation, where the working set of pixels can far exceed the amount of GDDR memory available on the graphics hardware. With non-volatile storage closer to the GPU, the response time and size of the virtual texture maps supported can be improved. In addition, real-time mega-textures could leverage this capability, adding considerable depth and realism to 3D games.

An additional advantage may involve the expansion of the types of algorithms applicable to non-graphical GPU programmability (e.g., general-purpose computation on graphics processing units/GPGPU) techniques. These techniques can use a GPU as high-performance offload engine, levering the data-parallel capabilities of its micro-architecture. While this technique can be powerful, it may conventionally only work for a very narrow set of algorithms because there may be a costly transfer from GPU to host system memory via the graphics bus (potentially for every computational pass). Adding a local SSD to the GPU pipeline, however, may enable the applications to hide this latency. Through a combination of storing partial results locally, consolidating transfers and other techniques, a major limiting factor of GPGPU-based approaches can be mitigated using the techniques described herein.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a host device having a central processing unit to execute an application;
a graphics processing unit;
a non-volatile memory dedicated to the graphics processing unit;
a volatile memory dedicated to the graphics processing unit; and
logic to:
  detect, at a driver stack, a request for content from the application;
  determine whether the non-volatile memory contains the content;
  allocate a buffer resource to the content if the non-volatile memory contains the content;
  return an identifier of the buffer resource to the host device;
  transfer the content to the buffer resource if an optimization criterion not based on data compression is met, the optimization criterion to be used by the driver stack, and detect a request for further content from the application if the optimization criterion is not met; and
  transfer the content from the buffer resource to the volatile memory via a direct memory access request.

2. The system of claim 1, further including:
a graphics card coupled to the graphics processing unit, the non-volatile memory, and the volatile memory; and
a bus coupled to the graphics card and the host device.

3. The system of claim 1, further including:
a graphics card coupled to the graphics processing unit and the volatile memory;
a first bus coupled to the graphics card and the host device;
a memory card coupled to the non-volatile memory; and
a second bus coupled to the memory card and the host device.

4. The system of claim 1, wherein the logic is associated with at least one of the graphics processing unit and the central processing unit, and wherein the optimization criterion is based on one or more of a reordering of work flow, an optimization of a file system for streaming loads, or an optimization of a batching of read/write requests.

5. A non-transitory computer readable storage medium comprising a set of stored instructions which, if executed by a processor, cause a computer to:
  detect, at a driver stack, a request for content from an application;
  determine whether a non-volatile memory dedicated to a graphics processing unit contains the content;
  allocate a buffer resource to the content if the non-volatile memory contains the content;
  return an identifier of the buffer resource to the host device;
  transfer the content to the buffer resource if an optimization criterion not based on data compression is met, the optimization criterion to be used by the driver stack, and detect a request for further content from the application if the optimization criterion is not met; and
  transfer the content from the buffer resource to the volatile memory via a direct memory access request.

6. The computer readable storage medium of claim 5, wherein the application is a graphics application, and wherein the optimization criterion is based on one or more of a reordering of work flow, an optimization of a file system for streaming loads, or an optimization of a batching of read/write requests.

7. The computer readable storage medium of claim 6, wherein the content includes texture content.

8. The computer readable storage medium of claim 5, wherein the content includes procedurally generated content.

9. The computer readable storage medium of claim 5, wherein the instructions, if executed, further cause a computer to transmit a direct memory access request to the volatile memory.

10. The computer readable storage medium of claim 5, wherein the request is to be associated with a general-purpose computation on graphics processing unit (GPGPU) workload.

11. The computer readable storage medium of claim 5, wherein the instructions, if executed, further cause a computer to receive the request for content from a graphics application associated with a host device.

12. An apparatus comprising:
a graphics processing unit;
a non-volatile memory dedicated to the graphics processing unit;
a volatile memory dedicated to the graphics processing unit; and
logic to:
  detect, at a driver stack, a request for content from an application;
  determine whether the non-volatile memory contains the content;
  allocate a buffer resource to the content if the non-volatile memory contains the content;
  return an identifier of the buffer resource to a host device;
  transfer the content to the buffer resource if an optimization criterion not based on data compression is met, the optimization criterion to be used by the driver stack, and detect a request for further content from the application if the optimization criterion is not met; and
  transfer the content from the buffer resource to the volatile memory via a direct memory access request.

13. The apparatus of claim 12, wherein the application is a graphics application.

14. The apparatus of claim 12, wherein the content includes procedurally generated content.

15. The apparatus of claim 12, wherein the content includes texture content.

16. The apparatus of claim 12, wherein the logic is to cause the apparatus to transmit a direct memory access request to the volatile memory.

17. The apparatus of claim 12, further including a graphics card coupled to the graphics processing unit and the non-volatile memory.

18. The apparatus of claim 12, further including:
a graphics card coupled to the graphics processing unit; and
a memory card coupled to the non-volatile memory.

19. The apparatus of claim 12, wherein the logic is at least partially implemented by the graphics processing unit.

20. The apparatus of claim 12, further comprising:
a non-volatile memory that is dedicated to a central processing unit of a host device;
a volatile memory that is dedicated to the central processing unit of the host device; and a bus connecting the central processing unit of the host device to the graphics processing unit, wherein the logic is at least partially implemented by the central processing unit of the host device.

21. The apparatus of claim 20, wherein the request is to be associated with a general-purpose computation on graphics processing unit (GPGPU) workload.

22. The apparatus of claim 12, wherein the optimization criterion is based on one or more of a reordering of work flow, an optimization of a file system for streaming loads, an optimization of a batching of read/write requests, or an optimization of spatial locality of accesses.

* * * * *